(12) United States Patent
Takori et al.

(10) Patent No.: US 12,304,383 B2
(45) Date of Patent: May 20, 2025

(54) VEHICLE HEADLIGHT DEVICE HAVING A PATTERN EMITTER

(71) Applicant: HONDA MOTOR CO., LTD., Tokyo (JP)

(72) Inventors: Masayoshi Takori, Tokyo (JP); Shingo Nakayama, Tokyo (JP); Tadahiro Matori, Tokyo (JP); Yuji Tsuchiya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/896,923

(22) Filed: Sep. 26, 2024

(65) Prior Publication Data

US 2025/0108753 A1    Apr. 3, 2025

(30) Foreign Application Priority Data

Sep. 29, 2023   (JP) ................................ 2023-170530

(51) Int. Cl.
*B60Q 1/24*    (2006.01)
*B60Q 1/00*    (2006.01)
*F21S 41/00*   (2018.01)
*F21W 102/17*  (2018.01)

(52) U.S. Cl.
CPC ........... *B60Q 1/247* (2022.05); *B60Q 1/0041* (2013.01); *F21S 41/00* (2018.01); *F21W 2102/17* (2018.01)

(58) Field of Classification Search
CPC .. F21W 2102/17; B60Q 1/247; B60Q 1/0041; B60Q 1/085; B60Q 2300/45; B60Q 9/008
See application file for complete search history.

(56) References Cited

U.S. PATENT DOCUMENTS 9,580,007 B2 *   2/2017   Shiraki ................. B60Q 1/085
2022/0299181 A1   9/2022   Takori et al.

FOREIGN PATENT DOCUMENTS

JP    2022143872 A    10/2022

* cited by examiner

*Primary Examiner* — Robert J May
(74) *Attorney, Agent, or Firm* — CKC & Partners Co., LLC

(57) ABSTRACT

A vehicle headlight device including a low-beam lamp and a high-beam lamp that emit light into a first light distribution region that is in front of a vehicle, and a patterned-light emitter that emits light into a second light distribution region in an illumination pattern in which bright regions and dark regions alternately repeat, the second light distribution region being further toward an outer side than the first light distribution region in a width direction of the vehicle. The patterned-light emitter emits light such that at least part of a region of the illumination pattern has a movement that is different from other regions of the illumination pattern.

3 Claims, 8 Drawing Sheets

VEHICLE HEADLIGHT DEVICE HAVING A PATTERN EMITTER

This application is based on and claims the benefit of priority from Japanese Patent Application No. 2023-170530, filed on 29 Sep. 2023, the content of which is incorporated herein by reference.

BACKGROUND OF THE INVENTION

Field of the Invention

The present disclosure relates to a vehicle headlight device.

Related Art

A vehicle headlight device has been proposed that employs a technology in which visibility of a pedestrian can be improved for a driver by emitting light from a light source in an illumination pattern in which bright regions and dark regions alternately repeat (for example, see Japanese Unexamined Patent Application, Publication No. 2022-143872). With the vehicle headlight device of Japanese Unexamined Patent Application, Publication No. 2022-143872, light is emitted simultaneously in a first illumination pattern, in which bright regions and dark regions alternately repeat, and in a second illumination pattern in which all regions are bright regions so that the presence of a pedestrian that is at a position further ahead can be instantaneously recognized by the driver.

Patent Document 1: Japanese Unexamined Patent Application, Publication No. 2022-143872

SUMMARY OF THE INVENTION

However, recent increases in demand for improvement in visibility of an object for a driver have led to a demand for further improvement in technology.

The present disclosure has been made in consideration of the above circumstances, and an object of the present disclosure is to provide a vehicle headlight device capable of reducing the possibility of a driver failing to notice the object.

According to a first aspect of the present disclosure, a vehicle headlight device (for example, a vehicle headlight device 1 that is described later) includes:
a low-beam lamp (for example, a low-beam lamp 5 that is described later) and a high-beam lamp (for example, a high-beam lamp 6 that is described later) that emit light into a first light distribution region (for example, a first light distribution region A1 that is described later) that is in front of a vehicle; and
a patterned-light emitter (for example, a patterned-light emitter PP that is described later) that emits light into a second light distribution region (for example, a second light distribution region A2 that is described later) in an illumination pattern in which bright regions (for example, bright regions a1 that are described later) and dark regions (for example, dark regions a2 that are described later) alternately repeat, the second light distribution region being further toward an outer side than the first light distribution region in a width direction of the vehicle. The patterned-light emitter emits light such that at least part of a region (for example, a specific region A26 that is described later) of the illumination pattern has a movement that is different from another region of the illumination pattern.

According to a second aspect of the present disclosure, in the vehicle headlight device according to the first aspect, the patterned-light emitter emits light such that the illumination pattern moves while maintaining a shape of the illumination pattern and such that a region of the illumination pattern as a whole and a region in which an object is present in the illumination pattern have movements that are different.

According to a third aspect of the present disclosure, in the vehicle headlight device according to the first aspect, the patterned-light emitter emits light such that the illumination pattern moves while maintaining a shape of the illumination pattern and such that an upper region of the illumination pattern and a lower region of the illumination pattern have movements that are different.

With the vehicle headlight device according to the first aspect, the patterned-light emitter emits light such that at least part of a region of the illumination pattern has a movement that is different from another region of the illumination pattern. For this reason, it is possible for the driver to specifically recognize the object such as the pedestrian in the region of the one part of the illumination pattern from things in other regions. Accordingly, it is possible to reduce the possibility of the driver failing to notice the object.

With the vehicle headlight device according to the second aspect, the patterned-light emitter emits light such that the illumination pattern moves while maintaining the shape of the illumination pattern and such that the region of the illumination pattern as a whole and the region in which the object is present in the illumination pattern have movements that are different. For this reason, it is possible for the driver to clearly recognize the behavior of the object such as the pedestrian which is moving. Accordingly, the driver can respond according to the behavior of the object earlier.

With the vehicle headlight device according to the third aspect, the patterned-light emitter emits light such that the illumination pattern moves while maintaining a shape of the illumination pattern and such that the upper region of the illumination pattern and the lower region of the illumination pattern have movements that are different. For this reason, it is possible for the driver to clearly recognize the behavior of the object such as the pedestrian which is moving. Accordingly, the driver can respond according to the behavior of the object earlier.

DETAILED DESCRIPTION OF THE INVENTION

The following describes one embodiment of the present disclosure with reference to the drawings. In the following description, "illumination pattern light distribution region" refers to an illumination region of light with specific characteristics, and "illumination pattern" refers to an illumination mode of light on the illumination pattern light distribution region.

Figure 1:
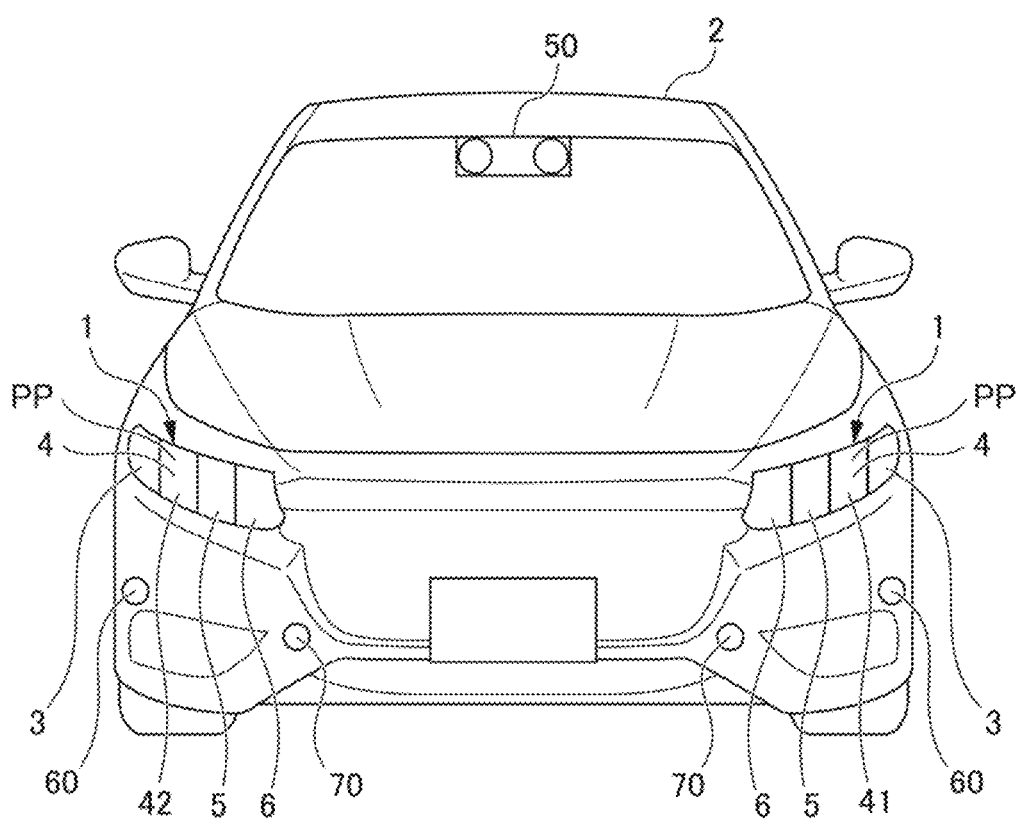
FIG. 1 is a schematic diagram illustrating a vehicle headlight device and a detection means according to an embodiment of the present disclosure.

FIG. 1 is a schematic diagram illustrating a vehicle headlight device 1 and a detection means according to one embodiment of the present disclosure. The vehicle headlight device 1 is provided on each of a left side and a right side of a vehicle 2 so as to be bilaterally symmetrical when viewed from a center position in a vehicle width direction of the vehicle 2. In the vehicle headlight device 1, a turn signal lamp 3, a pattern illumination lamp 4, a low-beam lamp 5, and a high-beam lamp 6 are arranged in this order from an outer side of the vehicle 2 toward an inner side of the vehicle 2 in the vehicle width direction. The pattern illumination lamp 4 is a collective term for a left pattern illumination lamp 41 and a right pattern illumination lamp 42.

The detection means includes a camera 50, a radar 60, a finder 70, and an object recognition unit 80 that is described later. The camera 50 is arranged at a center of the upper portion of a front window of the vehicle 2. The radar 60 is arranged on a left-side part and a right-side part, below the left-side and right-side vehicle headlight device 1, respectively. The finder 70 is arranged separated on each of the left side and the right side, at a position that is closer to an inner side than the radar 60 on each of the left side and the right side of a front lower portion of the vehicle 2.

The turn signal lamp 3 is a conventional lamp of this type. The pattern illumination lamp 4, which is a constituent element of a patterned-light emitter PP, illuminates a second light distribution region A2 that is described later of the vehicle 2 with light in an illumination pattern (see FIG. 5) in which bright regions a1 and dark regions a2 alternately repeat. The low-beam lamp 5 illuminates a low-beam light distribution region AL with light. The high-beam lamp 6 illuminates a high-beam light distribution region AH with light. Hereinafter, the vehicle 2, which is equipped with the vehicle headlight device 1, may be referred to as a host vehicle 2 as appropriate. In the above description, the second light distribution region A2 that is in front to the right of a travel lane of the host vehicle 2 is referred to as a right second light distribution region A22. Further, the second light distribution region A2 that is in front to the left of the travel lane of the host vehicle 2 is referred to as a left second light distribution region.

The camera 50 is a stereo camera, and periodically and repeatedly takes images of an area in front of the host vehicle 2. The radar 60 detects an object to be detected, for example by the frequency modulated continuous wave (FM-CW) method. The finder 70 is, for example, light detection and ranging, or Laser Imaging Detection and Ranging (LIDAR) that measures scattered light with respect to illuminating light and measures a distance to the object. In addition, the vehicle 2 is equipped with an advanced driver assistance system (ADAS) that includes a collision mitigation brake system (CMBS).

Figure 2:
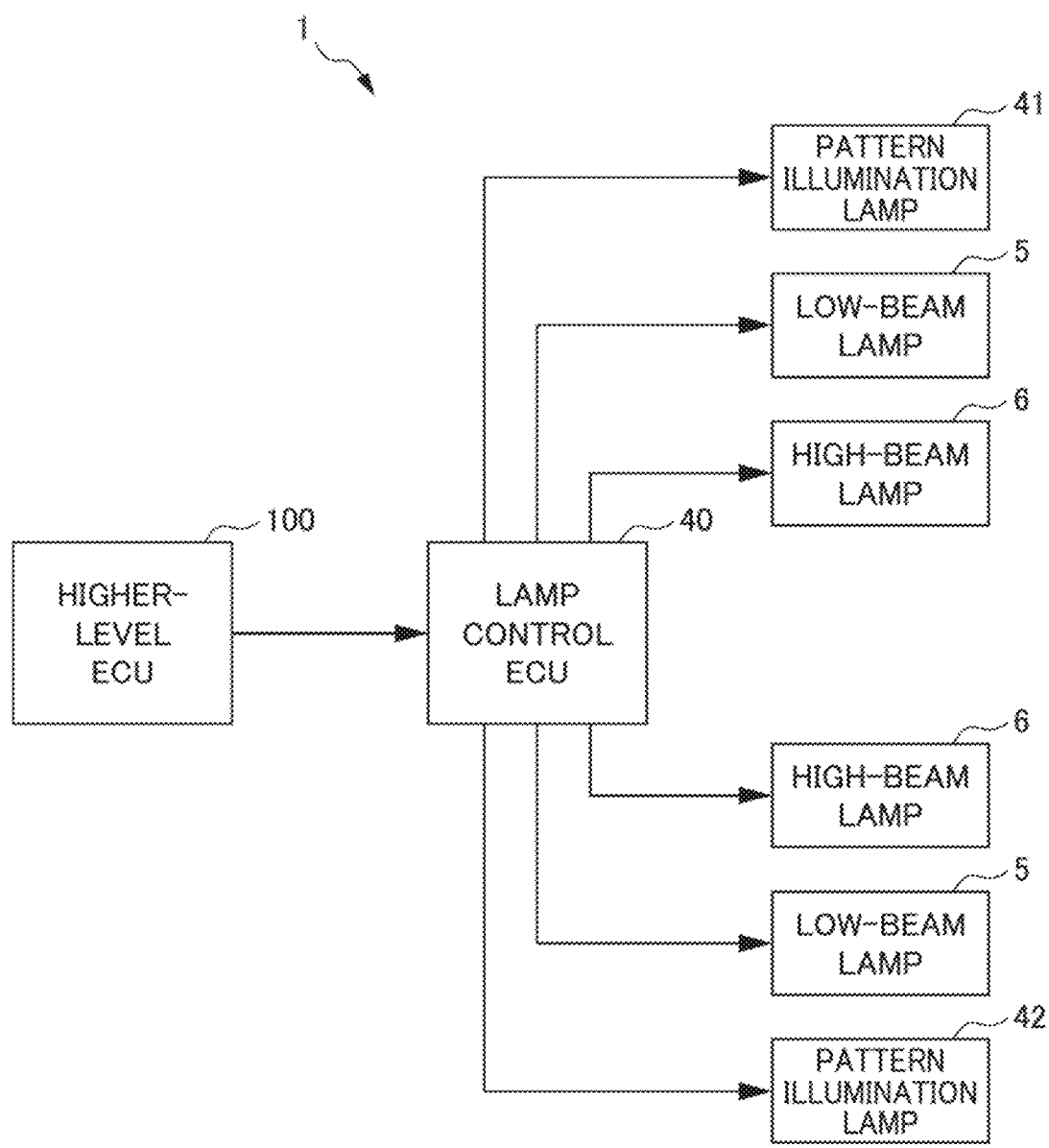
FIG. 2 is a conceptual configuration diagram illustrating a control system for each lamp in the vehicle headlight device in FIG. 1.
Figure 3:
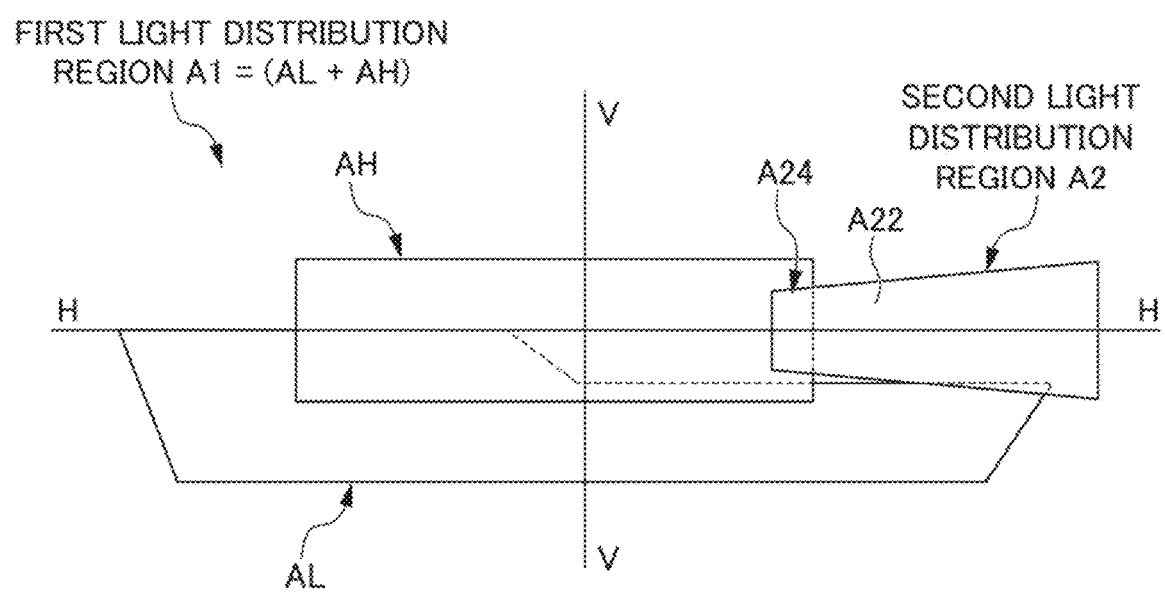
FIG. 3 is a view illustrating an illumination region of each lamp in the vehicle headlight device in FIG. 1.

FIG. 2 is a conceptual configuration diagram illustrating a control system for each lamp in the vehicle headlight device 1 in FIG. 1. FIG. 3 is a view illustrating an illumination region of each lamp in the vehicle headlight device 1. The high-beam lamp 6, the low-beam lamp 5, the left pattern illumination lamp 41, and the right pattern illumination lamp 42 operate under control of a lamp control electronic control unit (ECU) 40. The lamp control ECU 40 switches operation modes of the high-beam lamp 6, the low-beam lamp 5, the left pattern illumination lamp 41, and the right pattern illumination lamp 42 based on an output from a higher-level ECU 100 or the like equipped in the vehicle 2.

The high-beam lamp 6 includes a light-emitting element that is a light source, a reflector, a light shielding plate which defines an illumination region, and a lens. Power is supplied by a power source, not shown, in accordance with a control signal from the lamp control ECU 40, causing the light-emitting element to emit light. The light emitted from the light-emitting element is reflected by the reflector. The reflected light from the reflector radiates from the lens toward the high-beam light distribution region AH defined by the light shielding plate.

The low-beam lamp 5 includes a light-emitting element that is a light source, a reflector, a light shielding plate which defines an illumination region, and a lens. Power is supplied by a power source, not shown, in accordance with a control signal from the lamp control ECU 40, causing the light-emitting element to emit light. The light from the light-emitting element is reflected by the reflector. The reflected light from the reflector radiates from the lens toward the low-beam light distribution region AL defined by the light shielding plate.

with reference to FIG. 3, the illumination regions of the high-beam lamp 6, the low-beam lamp 5, and the pattern illumination lamp 4 in a case in which the vehicle headlight device 1 in FIG. 1 illuminates a test screen with light are described. Here, the illumination region due to the pattern illumination lamp 4 indicates the illumination region by the right pattern illumination lamp 42.

The illumination region of the left pattern illumination lamp 41 is symmetrical to the illumination region of the right pattern illumination lamp 42 about a line V-V but is not shown.

The configuration and operation of the left pattern illumination lamp 41 are similar to the configuration and operation of the right pattern illumination lamp 42. For this reason, in the following, the description of the right pattern illumination lamp 42 will be referred to for the configuration and operation of the left pattern illumination lamp 41.

The low-beam light distribution region AL of the low-beam lamp 5 has an oncoming-lane-side cutoff line extending in parallel with a line H-H (horizontal line) on the right of the line V-V (vertical line) that is central in a left-right direction on the test screen. On the left side of the line V-V, the low-beam light distribution region AL of the low-beam lamp 5 has an own-lane-side cutoff line extending along the line H-H at a position higher than the oncoming-lane-side cutoff line. Both the oncoming-lane-side cutoff line and the own-lane-side cutoff line are connected by an oblique cutoff line inclined with respect to the line H-H. The low-beam light distribution region AL is a lower illumination region that is in front and downward of the vehicle 2.

The high-beam light distribution region AH of the high-beam lamp 6 has a rectangular shape with a long side parallel to the line H-H and a short side parallel to the line V-V and has diagonals that intersect at roughly the same position as the intersection of the line H-H and the line V-V. The high-beam light distribution region AH overlaps the low-beam light distribution region AL in a lower partial region including a portion of the oncoming-lane-side cutoff line and a portion of the low-beam light distribution region AL, that are both close to the line V-V. The high-beam light distribution region AH is an upper illumination region that is more upward and more central in the vehicle width direction of the vehicle 2 than the low-beam light distribution region AL, which is a lower illumination region. The low-beam light distribution region AL and the high-beam light distribution region AH are collectively referred to as a first light distribution region A1.

The right second light distribution region A22, which is an illumination region of the right pattern illumination lamp 42, has an illumination pattern that can change in various ways, such as a shape of an outline of the region and a scheme of the illumination pattern in the region, due to a mode switching signal from the lamp control ECU 40. The left second light distribution region, which is symmetrical to the right second light distribution region A22 about the line V-V, is not illustrated. The left second light distribution region and the right second light distribution region A22 are collectively referred to as the second light distribution region A2.

Due to capabilities of the right pattern illumination lamp 42, the right second light distribution region A22 may have a wide form that includes an overlapping region A24 that overlaps the high-beam light distribution region AH. When adopting this shape, the right second light distribution region A22 has a trapezoidal shape that in a landscape orientation in which the height direction is parallel to the line H-H and the upper base and the lower base are parallel to the line V-V. This trapezoid shape has a lower base that is relatively further from the line V-V than an upper base and is longer than the upper base. That is, the right second light distribution region A22 has a shape in which the dimension along the line V-V increases toward the outer side in the vehicle width direction of the vehicle 2.

Figure 4:
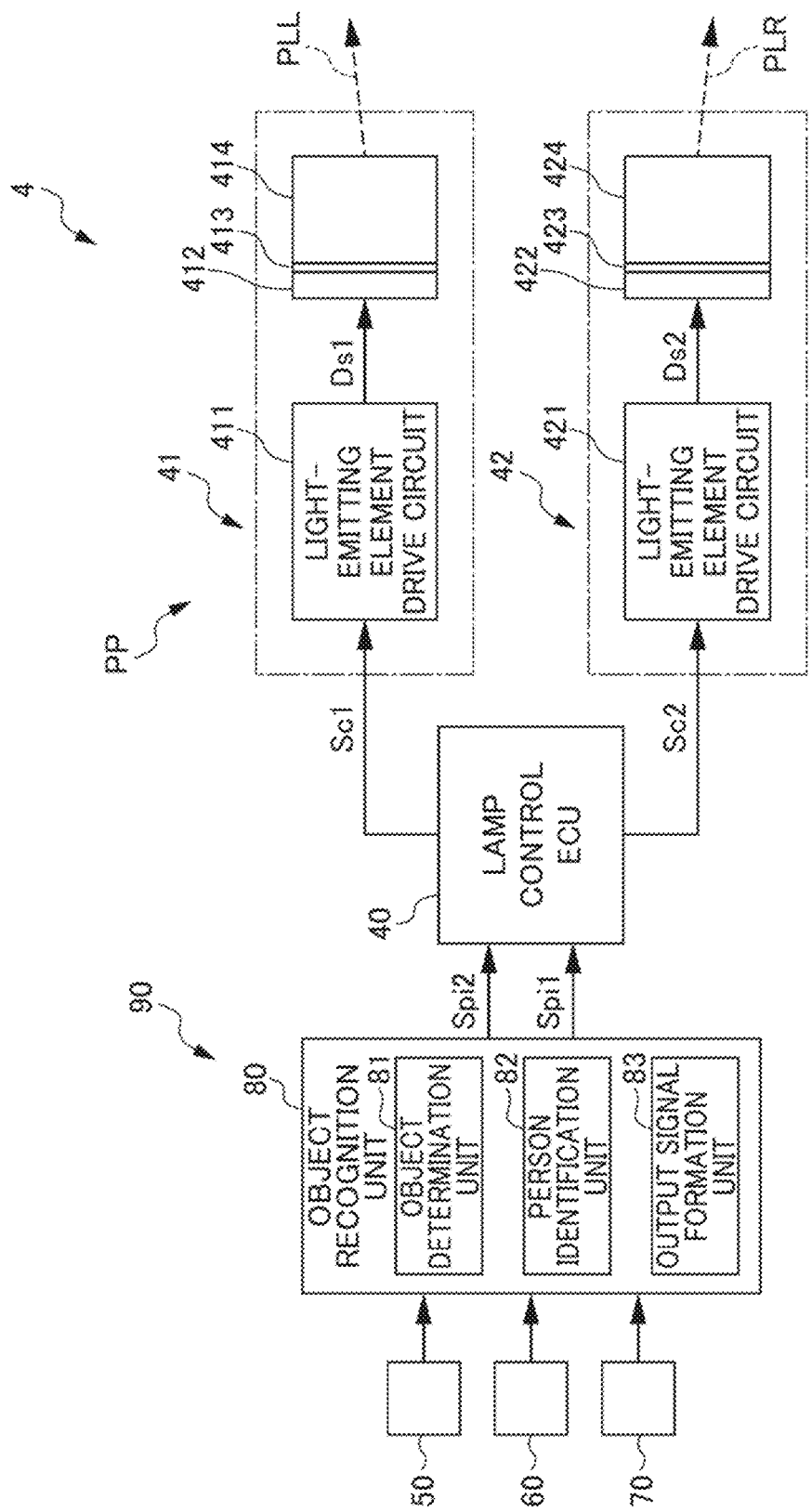
FIG. 4 is a conceptual configuration diagram illustrating the control system that is related to a pattern illumination lamp in FIG. 2.

FIG. 4 is a conceptual configuration diagram illustrating the control system related to a pattern illumination lamp in FIG. 2. The camera 50, the radar 60, the finder 70, and the object recognition unit 80 constitute a detection means 90. The object recognition unit 80 recognizes the position, the type, the speed, and the like of the object to be detected, based on a detection result of a part or all of the camera 50, the radar 60, and the finder 70.

The object recognition unit 80 includes an object determination unit 81, a person identification unit 82, and an output signal formation unit 83. The object determination unit 81 detects a distance and a direction of the object to be detected, which is present at a predetermined range from the host vehicle 2, based on distance information included in monitoring information input from the camera 50, the radar 60, and the finder 70. The object determination unit 81 specifies, as a reference point, a position indicated by position information included in association with the distance information, and, with the distance and direction that is detected from the specified reference point, determines a position at which the object to be detected is present.

The person identification unit 82 refers to image information taken by the camera 50 and identifies the object to be detected, which is captured by the object determination unit 81, as a person such as a pedestrian 15 that is described later.

In accordance with an identification result of the person identification unit 82, the output signal formation unit 83 generates a person identification signal Spi as a detection output that transitions to a high level H in a case in which the object to be detected is identified as a person, and supplies the person identification signal Spi to the lamp control ECU 40 as a control means.

Specifically, the person identification signal Spi, as the detection output, includes two stages of signals, a person identification signal Spi1 and a person identification signal Spi2, that correspond to a pedestrian accuracy. The person identification signal Spi1 represents a first pedestrian accuracy at which the object to be detected is likely to be a pedestrian and which is sufficient for a pedestrian protection brake to be operated. The person identification signal Spi2 represents a second pedestrian accuracy which is lower than the first pedestrian accuracy. Therefore, in a case in which the vehicle 2 is traveling, the person identification signal Spi2 is emitted (transitions to the high level H) at a time that is earlier than when the person identification signal Spi1 is emitted.

The person identification signal Spi1 and the person identification signal Spi2 are output, for example, into separate signal channels so that both person identification signals can be distinguished. The person identification signal Spi can take a form in which both person identification signals may be superimposed in a single signal channel so that both person identification signals are distinguished without being output into separate signal channels. In a case in which the person identification signal Spi2 from the object recognition unit 80 is at the high level H, the lamp control ECU 40 supplies an activation command signal Sc1 and/or an activation command signal Sc2 to the pattern illumination lamp 4.

The pattern illumination lamp 4 includes the left pattern illumination lamp 41 and the right pattern illumination lamp 42. The left pattern illumination lamp 41 has a light-emitting element drive circuit 411 that generates an element-driving signal Ds1 in response to the activation command signal Sc1 supplied from the lamp control ECU 40, and supplies the element-driving signal Ds1 to a surface-emitting element 412. The surface-emitting element 412 emits light in response to the element drive signal Ds1. Due to the light emission from the surface-emitting element 412, the left pattern illumination lamp 41 emits a left illuminating light PLL in a first illumination pattern through a light-shielding mask 413 and a projection optical system 414 and toward the left second light distribution region A21.

The right pattern illumination lamp 42 has a light-emitting element drive circuit 421 that generates an element-driving signal Ds2 in response to the activation command signal Sc2 supplied from the lamp control ECU 40, and supplies the element-driving signal Ds2 to a surface-emitting element 422. The surface-emitting element 422 emits light in response to the element drive signal Ds2. Due to the light emission from the surface-emitting element 422, the right pattern illumination lamp 42 emits a right illuminating light PLR in a second illumination pattern through a light-shielding mask 423 and a projection optical system 424 toward the right second light distribution region A22. As described above, in one embodiment of the present disclosure, the first illumination pattern and the second illumination pattern are the same illumination pattern.

Here, the light-shielding mask 413 in the left pattern illumination lamp 41 may include an all-solid-state light-regulating mirror film in which a mirror state and a transparent state are electrically switched for each region thereof.

Illuminating light from the projection optical system 414 in the illumination pattern, in which the bright regions a1 and the dark regions a2 alternately repeat, is generated by an electrical drive from the light-emitting element drive circuit 411 to the surface-emitting element 412 and the light-shielding mask 413. This illumination pattern may have a form in which the pattern moves along a traveling direction of the vehicle 2 while maintaining a shape of the illumination pattern.

Similar to the light-shielding mask 413 in the left pattern illumination lamp 41, the light-shielding mask 423 in the right pattern illumination lamp 42 may include an all-solid-state light-regulating mirror film in which a mirror state and a transparent state are electrically switched for each region. Illuminating light from the projection optical system 424 in the illumination pattern, in which the bright regions a1 and the dark regions a2 alternately repeat, is generated by an electrical drive from the light-emitting element drive circuit 421 to the surface-emitting element 422 and the light-shielding mask 423. This illumination pattern may have a form in which the pattern moves along the traveling direction of the vehicle 2 while maintaining the form of the illumination pattern.

The pattern illumination lamp 4 and a circuit unit, which relates to control of the pattern illumination lamp 4 that is described with reference to FIG. 4, constitute the patterned-light emitter PP that emits light into the second light distribution region A2 in the illumination pattern in which the bright regions a1 and the dark regions a2 alternately repeat. The second light distribution region A2 is further toward the outer side than the first light distribution region A1 of the high-beam lamp 6 and the low-beam lamp 5 in the vehicle width direction of the vehicle 2.

Figure 5:
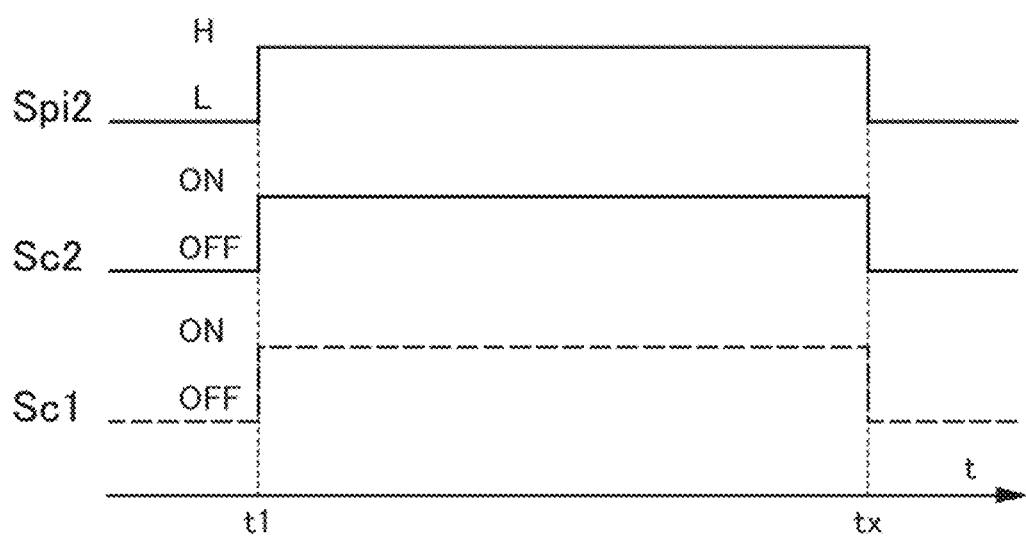
FIG. 5 is a timing chart illustrating an operation of the pattern illumination lamp, a detection means and a control means in FIG. 4.

FIG. 5 is a timing chart illustrating an operation of the pattern illumination lamp 4, the detection means 90, and the lamp control ECU 40 as the control means in FIG. 4. As described with reference to FIG. 4, the person identification signal Spi2 of the person identification signals from the object recognition unit 80 of the detection means 90 is at the high level H, the lamp control ECU 40 generates the activation command signal Sc2 and causes the right illuminating light PLR to be emitted from the right pattern illumination lamp 42.

As illustrated in FIG. 5, at a time t1 at which the person identification signal Spi2 transitions to the high level H, the lamp control ECU 40 responds to the transition by transitioning the activation command signal Sc2 to ON and causing the right illuminating light PLR to be emitted from the right pattern illumination lamp 42. In addition, upon determining based on information input from the higher-level ECU 100 that no adverse conditions will result from the right illuminating light PLR being emitted, the lamp control ECU 40 causes the right illuminating light PLR to be emitted. Further, upon determining that the left illuminating light PLL should be emitted, the lamp control ECU 40 generates the activation command signal Sc1, causing the left illuminating light PLL to be emitted from the left pattern illumination lamp 41.

In a case in which the detection means 90 fails to detect the presence of the pedestrian 15 in the illumination pattern light distribution region 16, the person identification signal Spi2 that turns off the patterned-light emitter becomes a low level L. In FIG. 5, at a time point tx at which the person identification signal Spi2 transitions to the low level L, the lamp control ECU 40 responds to the transition by transitioning the activation command signal Sc1 to the low level L and turns off the right pattern illumination lamp 42.

The system of FIG. 4, in which the left pattern illumination lamp 41 and the right pattern illumination lamp 42 operate as described above under control of the lamp control ECU 40, constitutes a projector.

Figure 6:
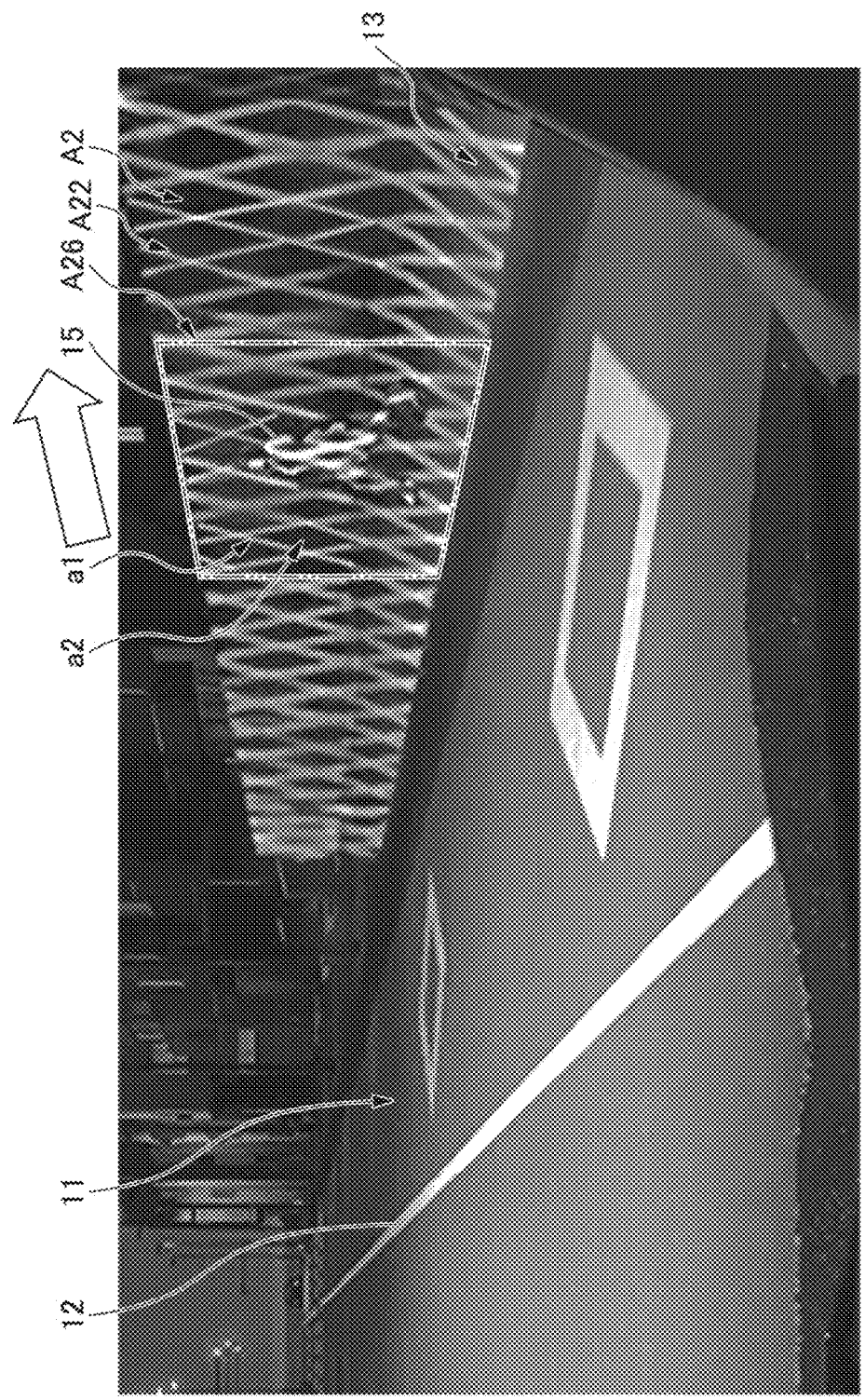
FIG. 6 is a view illustrating a driver's field of view illuminated with illuminating light according to one embodiment of the present disclosure from the pattern illumination lamp in FIG. 2.

FIG. 6 is a view illustrating a driver's field of view illuminated with illuminating light according to one embodiment of the present disclosure from the pattern illumination lamp in FIG. 2. A lane marking 12 is drawn on a road 11, and at a side of the road 11 is a sidewalk 13. It is assumed that the pedestrian 15 is present on the sidewalk 13. A region that includes the sidewalk 13 on the right side as viewed from the driver is the right second light distribution region A22 illuminated by the right pattern illumination lamp 42. The right pattern illumination lamp 42 illuminates the right second light distribution region A22 with right illuminating light PLR with the illumination pattern in which the bright regions a1 and the dark regions a2 alternately repeat.

As already described, the right illuminating light PLR is emitted upon the lamp control ECU 40 determining, based on information input from the higher-level ECU 100, that no adverse conditions will result from the right illuminating light PLR being emitted. Upon determining that the left illuminating light PLL should be emitted, the lamp control ECU 40 generates the activation command signal Sc1, causing the left pattern illumination lamp 41 to emit the left illuminating light PLL and illuminate the left second light distribution region that includes another sidewalk 14 and which is not shown in FIG. 6.

The patterned-light emitter PP emits light such that a specific region A26, which is a part of a region of the illumination pattern, in which bright regions a1 and dark regions a2 alternately repeat, has a movement that is different from other regions of the illumination pattern.

Specifically, under the control of the lamp control ECU 40, the person identification unit 82 in the detection means 90 described with reference to FIG. 4 depends on the person identification signals Spi, which are generated upon the object to be detected being identified as the person such as the pedestrian 15, and sets, in the right second light distribution region A22, the specific region A26 as a limited region that includes the person that is identified. Specifically, the specific region A26 is set based on an output of the person identification signals Spi2, for example, which indicates the second pedestrian accuracy that has a relatively lower pedestrian accuracy, in the person identification signal Spi. With this configuration, when the object determination unit 81 captures the object to be detected, the specific region A26 can be quickly set. Further, the specific region A26 is set so that the object to be detected that is captured by the object determination unit 81 is located at the center of the specific region A26. With this configuration, it is possible to accurately capture the object to be detected, which is of interest.

Further, under the control of the lamp control ECU 40, the specific region A26 is set. In the specific region A26 for example, the illumination pattern, in which the bright regions a1 and the dark regions a2 alternately repeat, moves while maintaining the shape of the illumination pattern, and a moving speed of a flow of the illumination pattern is increased more than in other parts in the right second light distribution region A22 (A2). With this configuration, it is possible for the driver to specifically recognize the object such as the pedestrian 15 in the specific region 26 from things in other regions. Accordingly, it is possible to reduce the possibility of the driver failing to notice the object such as the pedestrian 15.

In addition, instead of increasing the moving speed of the illumination pattern in the specific region A26 while maintaining the shape of the illumination pattern, a moving direction of the illumination pattern may be different from the regions outside the specific region A26. That is, in a case in which the movement of the illumination pattern in the regions outside the specific region A26 flows from a position closer to the vehicle 2 to a position further ahead of the vehicle 2 as seen from the driver of the vehicle 2, the illumination pattern in the specific region A26 is made to flow from a position further ahead of the vehicle 2 to a position closer to the vehicle 2 as seen from the driver. Further and conversely, in a case in which the movement of the illumination pattern in the regions outside the specific region A26 flows from a position further ahead of the vehicle 2 to a position closer to the vehicle 2 as seen from the driver of the vehicle 2, the illumination pattern in the specific region A26 is made to flow from a position closer to the vehicle 2 to a position further ahead of the vehicle 2 as seen from the driver. Also in these cases, it is possible for the driver to specifically recognize the object such as the pedestrian in the specific region 26 from things in other regions. Accordingly, it is possible to reduce the possibility of the driver failing to notice the object such as the pedestrian 15.

Figure 7:
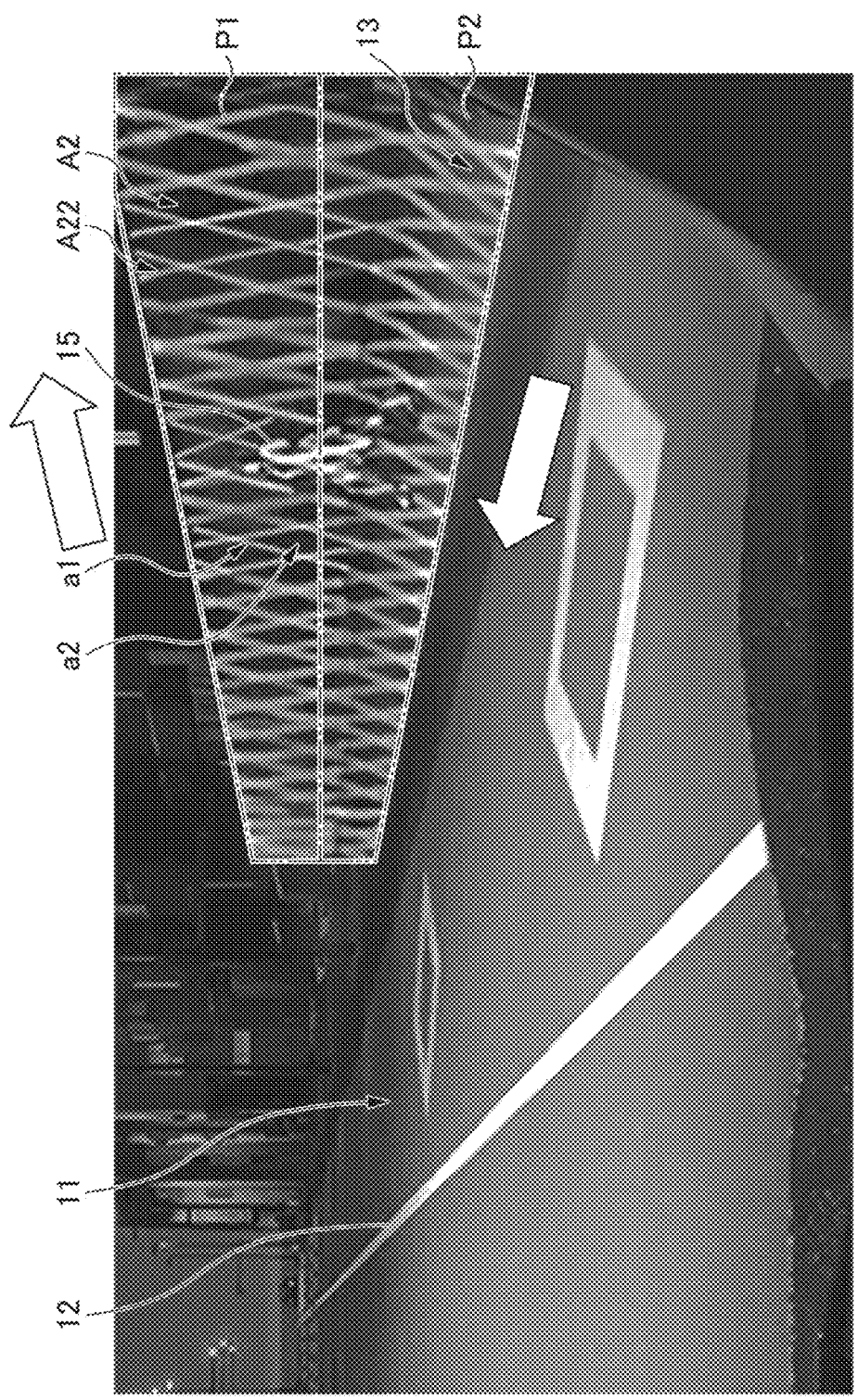
FIG. 7 is a view illustrating a driver's field of view illuminated with illuminating light according to other embodiments of the present disclosure from the pattern illumination lamp in FIG. 2.

Next, a vehicle headlight device according to another mode of the present disclosure is described with reference to FIG. 7. FIG. 7 is a view illustrating the driver's field of view illuminated with illuminating light according to other embodiments of the present disclosure from the pattern illumination lamp in FIG. 2. The lane marking 12 is drawn on the road 11, and at the side of the road 11 is the sidewalk 13. It is assumed that the pedestrian 15 is present on the sidewalk 13. The region that includes the sidewalk 13 on the right side as viewed from the driver is the right second light distribution region A22 illuminated by the right pattern illumination lamp 42. In addition, in FIG. 7, the right second light distribution region A22 is indicated by the reference numeral of the second light distribution region A2, which is a collective term for the right second light distribution region A22 in combination with the left second light distribution region. The right pattern illumination lamp 42 illuminates the right second light distribution region A22 with right illuminating light PLR with the illumination pattern in which the bright regions a1 and the dark regions a2 alternately repeat.

In addition, also in this case, the right illuminating light PLR is emitted upon the lamp control ECU 40 determining, based on information input from the higher-level ECU 100, that no adverse conditions will result from the right illuminating light PLR being emitted. Upon determining that the left illuminating light PLL should be emitted, the lamp control ECU 40 generates the activation command signal Sc1, causing the left pattern illumination lamp 41 to emit the left illuminating light PLL and illuminate the left second light distribution region that includes another sidewalk 14 and which is not shown in FIG. 6.

In the embodiment of FIG. 7, the patterned-light emitter PP emits an illumination pattern that is divided into an upper portion and a lower portion that behave differently. That is, in FIG. 7, an upper pattern P1 on the upper side and a lower pattern P2 on the lower side are illustrated, and both sides move while maintaining the shape of the illumination pattern, but both sides have movements that are different from each other. Specifically, for example, the upper pattern P1 moves in a first direction along the traveling direction of the vehicle 2, and the lower pattern P2 moves in a second direction opposite to the first direction. Alternatively, the upper pattern P1 and the lower pattern P2 may take forms with different flow speeds similar to the illumination pattern in the specific region A26 and in the regions outside the specific region A26 in FIG. 6.

Under the control of the lamp control ECU 40 of the patterned-light emitter PP, shapes and movements of the upper pattern P1 and the lower pattern P2 are realized by being driven by the right pattern illumination lamp 42. With this configuration, it is possible for the driver to clearly recognize the behavior of the object such as the pedestrian 15 which is moving. Accordingly, the driver can respond according to the behavior of the object earlier.

Figure 8:
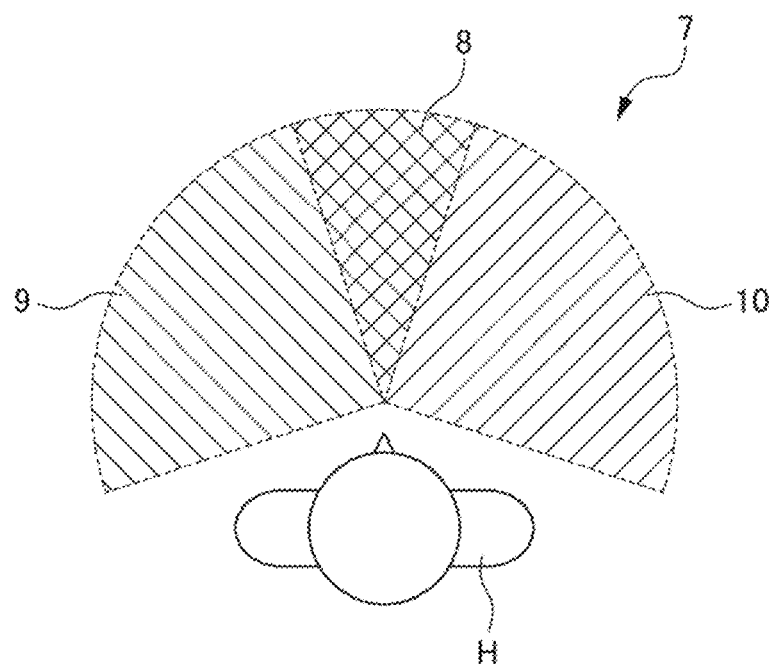
FIG. 8 is a diagram schematically illustrating human visual characteristics according to the technical idea of the present disclosure.

Here, FIG. 8 is a diagram schematically illustrating human visual characteristics that form the basis for the technical idea of the vehicle headlight device 1 according to the present disclosure. FIG. 8 illustrates a front field of view 7 of a human H divided, based on human visual characteristics, into a central field of view 8 that extends at a constant acute angle from the front to the left and right as well as a left peripheral field of view 9 and a right peripheral field of view 10 that are adjacent to the central field of view 8 on the left and right sides, respectively.

Regarding visual characteristics of an average human, shapes are clearly visible in the central field of view 8, but responses to movement tend to be slow. Whereas, in the left peripheral field of view 9 and the right peripheral field of view 10, shapes tend to be blurred, but responses to movement are fast, that is, the sensitivity to movement is higher. The vehicle headlight device 1 according to the present disclosure is based on the idea of actively utilizing the human visual characteristics described above. In the vehicle headlight device 1 according to the present disclosure, the illumination pattern, in which the bright regions a1 and the dark regions a2 alternately repeat, is projected into the left peripheral field of view 9 and the right peripheral field of view 10. Thus the driver can clearly recognize a moving object such as the pedestrian 15 on the road side, and the possibility of the driver failing to notice the pedestrian 15 can be further effectively reduced.

According to the vehicle headlight device 1 of the present embodiment, the following effects can be achieved.

With the vehicle headlight device 1 according to the first aspect, the vehicle headlight device 1 includes:

the low-beam lamp 5 and the high-beam lamp 6 that emit light into the first light distribution region A1 that is in front of the vehicle; and the patterned-light emitter PP that emits light into the second light distribution region A2 that is described later) in the illumination pattern in which the bright regions a1 and the dark regions a2 alternately repeat, the second light distribution region being further toward the outer side than the first light distribution region A1 in the width direction of the vehicle 2. The patterned-light emitter PP emits light such that at least the specific region A26, which is one part of the illumination pattern, has a movement that is different from other regions of the illumination pattern. For this reason, it is possible for the driver to specifically recognize the object such as the pedestrian in the specific region 26 from things in other regions. Accordingly, it is possible to reduce the possibility of the driver failing to notice the object.

With the vehicle headlight device 1 according to the second aspect, the patterned-light emitter PP emits light such that the illumination pattern moves while maintaining the shape of the illumination pattern and such that the region of the illumination pattern as a whole and the region in which the object is present in the illumination pattern have movements that are different. For this reason, it is possible for the driver to clearly recognize the behavior of the object such as the pedestrian 15 which is moving. Accordingly, the driver can respond according to the behavior of the object earlier.

With the vehicle headlight device 1 according to the third aspect, the patterned-light emitter PP emits light such that the illumination pattern moves while maintaining the shape of the illumination pattern and such that the upper region (P1) of the illumination pattern and the lower region (P2) of the illumination pattern have movements that are different. For this reason, it is possible for the driver to clearly recognize the behavior of the object such as the pedestrian 15 which is moving. Accordingly, the driver can respond according to the behavior of the object earlier.

One embodiment of the present application is described above, but the present disclosure is not limited thereto. The configuration of the details may be appropriately changed within the scope of the gist of the present disclosure. For example, in the above description, the patterned light illumination unit that emits light into the second light distribution region that is further toward the outer side in the width direction of the vehicle 2 in the illumination pattern, in which bright regions and dark regions alternately repeat, is configured to control the surface-emitting element and the light-shielding mask by the lamp control ECU, but other configurations can be selected. That is, it is possible to configure the patterned-light emitter as a projector unit that includes the light-emitting element, a spatial light modulator, and a lens. This spatial light modulator can be applied in the form of a digital micromirror device (DMD), which reflects light while modulating a number of reflective elements independently. Such a projector unit has a configuration based on Digital Light Processing (DLP) (registered trademark) that uses a DMD, and can radiate light in front of a vehicle and the periphery thereof from a lens in a desired illumination pattern.

EXPLANATION OF REFERENCE NUMERALS

A1 first light distribution region
A2 second light distribution region
A22 right second light distribution region
A24 overlapping region
A26 specific region
AL low-beam light distribution region
AH high-beam light distribution region
a1 bright region
A2 dark region
H human
P1 upper pattern
P2 lower pattern
PP patterned-light emitter
PLL left illuminating light
PLR right illuminating light
Spi, Spi1, Spi2 person identification signal (detection output)
1 vehicle headlight device
2 vehicle
3 turn signal lamp
4 pattern illumination lamp
5 low-beam lamp
6 high-beam lamp
7 front field of view
8 central field of view
9 left peripheral field of view
10 right peripheral field of view
11 road
12 lane marking
13 sidewalk
14 sidewalk
15 pedestrian
16 illumination pattern light distribution region
40 lamp control ECU 40
41 left pattern illumination lamp
42 right pattern illumination lamp
50 camera
60 radar
70 finder
80 object recognition unit
81 object determination unit
82 person identification unit
83 output signal formation unit
90 detection means
100 high-order ECU 100

What is claimed is:

1. A vehicle headlight device comprising:
a low-beam lamp and a high-beam lamp that emit light into a first light distribution region that is in front of a vehicle; and
a patterned-light emitter that emits light into a second light distribution region in an illumination pattern in which bright regions and dark regions alternately repeat, the second light distribution region being further toward an outer side than the first light distribution region in a width direction of the vehicle, wherein
the patterned-light emitter emits light such that at least part of a region of the illumination pattern has a movement that is different from another region of the illumination pattern.

2. The vehicle headlight device according to claim 1, wherein the patterned-light emitter emits light such that the illumination pattern moves while maintaining a shape of the illumination pattern and such that a region of the illumination pattern as a whole and a region in which an object is present in the illumination pattern have movements that are different.

3. The vehicle headlight device according to claim 1, wherein the patterned-light emitter emits light such that the illumination pattern moves while maintaining a shape of the illumination pattern and such that an upper region of the illumination pattern and a lower region of the illumination pattern have movements that are different.

* * * * *